United States Patent [19]
Beery et al.
[11] 3,734,491
[45] May 22, 1973

[54] MOVABLE GAP-CONTROL DEVICE

[75] Inventors: Jack Beery, Farmington; William B. Templeton, Howell, both of Mich.
[73] Assignee: Burroughs Corporation, Detroit, Mich.

[22] Filed: May 17, 1971
[21] Appl. No.: 143,756

[52] U.S. Cl. ....................271/51, 29/116, 29/130, 193/37
[51] Int. Cl. ....................B65h 5/06
[58] Field of Search....................271/51, 52, 8, 53; 235/61.11 D; 193/37; 179/100.2 MD; 29/110, 130, 116; 35/35 C

[56] References Cited

UNITED STATES PATENTS

| | | | |
|---|---|---|---|
| 2,677,200 | 5/1954 | MacChesney | 179/100.2 MD |
| 3,300,835 | 1/1967 | Barr | 193/37 X |
| 2,221,173 | 11/1940 | Gutsell | 29/130 |
| 3,109,924 | 11/1963 | Frederick | 235/61.11 D |
| 1,897,054 | 2/1933 | Hunter | 271/51 |

*Primary Examiner*—Evon C. Blunk
*Assistant Examiner*—Bruce H. Stoner, Jr.
*Attorney*—Kenneth L. Miller and Edwin W. Uren

[57] ABSTRACT

A device for uniformly urging a transported paper sheet or the like into contact with a processing element where a sheet-bearing surface formed by the periphery of a rotatable resilient member is positioned in contact with the processing element. Driving means frictionally coupled to the resilient member urges the contacting portion of the sheet-bearing surface in the direction of sheet transport but a frictional restraint between the processing element and the sheet-bearing surface holds the resilient member rotationally motionless until such time as a document is transported therebetween. Upon this occurrence the frictional force imparted to the resilient member is utilized to overcome the inertia of the resilient member and thus to assist in the acceleration of the sheet-bearing surface in the transported direction of the sheet.

12 Claims, 3 Drawing Figures

PATENTED MAY 22 1973 3,734,491

INVENTORS
JACK BEERY
BY WILLIAM B. TEMPLETON

MOVABLE GAP-CONTROL DEVICE

BACKGROUND OF THE INVENTION

This invention relates generally to apparatus for transporting thin items such as sheets of paper, and more particularly concerns means for urging a transported sheet against an operative position of a magnetic read head or the like.

In apparatus for transporting paper documents, there is often incorporated a processing element such as an optical or magnetic read head. Commonly a document is transported past the head where information contained on the document is read. The reading characteristics of most optical and magnetic reading heads require that the document being read pass in contact with or at a uniform distance from the operative position of the head. Movement of the document toward or away from the operative position of the head during transport is likely to result in a misread.

Placing a bearing surface on the opposite side of the transported document with respect to the operating position of the processing element, to thereby press the document into contact therewith, has been attempted as a straightforward solution to the problem posed. It has been found, however, that many considerations must be taken into account in designing an appropriate device for this purpose. First, the high speed at which documents are transported in many of the present document handling devices results in high frictional and impacting forces when rapidly transported documents come abruptly into sliding contact with such bearing surfaces. Forces of this sort tend to buckle, bend and thus jam documents as they enter between the operating position of the processing element and the bearing surface.

A further aspect that must be considered is the problem of dampening the oscillations of such resiliently biased bearing surfaces after being subjected to the initial shock of entering documents and to the shock caused by deviations in item thickness. As a sheet or document passes between bearing surfaces of this kind and the operating position of a processing element any nonuniform pressure exerted on the document by the bearing surface, as when the bearing surface oscillates, may cause deviations in read head output intensity, thus resulting in a misread. Although dampening of such oscillations may be attempted by utilizing any one of several well known techniques, a completely satisfactory solution to the problem has not heretofore been devised.

The provision of a movable bearing surface, such as the periphery of a roller mounted to bear against the transported document, serves to lessen the shock that would otherwise result from deviations in document thickness, the movable bearing surface tending to effectively roll over the bump presented by the leading edge of the document and deviations in the thickness thereof. However, until the sheet-bearing surface is accelerated to a speed approaching that of the transported document, the roller configuration would have little advantage over a stationary bearing surface since the inertial resistance of a rotationally stationary roller also tends to buckle and bend a document rapidly transported into engagement therewith.

To avoid having to accelerate the bearing surface each time a document is transported to the operative position of a processing element, the bearing surface could be continuously rotated in the direction and at the speed of sheet transport. Were such a bearing surface disposed out of contact with the processing element, however, insufficient pressure would be applied to an extremely thin document. On the other hand, if a moving bearing surface were placed in abutment with the processing element, undesirable wear would occur on the abutting surface.

SUMMARY OF THE INVENTION

With the foregoing considerations in mind, it is generally an object of the present invention to provide means for maintaining rapidly transported thin items in uniform and continuous contact with the operative position of a processing element.

It is another object of the present invention to provide a movable sheet-bearing surface to urge a rapidly transported sheet against the operative position of a processing element.

It is another object of the present invention to quickly dampen any oscillations of the sheet-bearing surface tending to deviate from the constant urging force applied to the transported sheet.

It is a further object of the invention to provide a sheet-bearing surface that remains motionless when in contact with the operative position of the processing element, so that neither the processing element nor the bearing surface is subjected to wear caused by the abrasive action of the sheet-bearing surface between sheet feeds.

It is still another object of the present invention to minimize the resistance to the movement of a rapidly transported sheet when it is interposed between the bearing surface and the processing element.

It is a related object of the present invention to reduce the inertial resistance required to accelerate a movable but stationary sheet-bearing surface when a sheet enters between the processing element and the sheet-bearing surface.

It is another related object of the present invention to reduce the frictional resistance of the sheet-bearing surface against the sheet.

In one of its aspects the invention may be adapted to drivably couple the sheet-bearing surface to the same driving means that is used to transport the sheets past the processing element, to decrease the inertial resistance of the sheet-bearing surface and its associated structure.

These and other objects and aspects of the present invention are accomplished by a combination comprising a resilient member having a sheet-bearing surface that is disposed in contact with an operative position of a processing element. The sheet-bearing surface is movable over the processing element in the direction of sheet-transport, and coupled to driving means effective for urging the sheet-bearing surface over the operative position of the processing element. A frictional force between the processing element and the sheet-bearing surface normally restrains any displacement of the bearing surface until such time as a transported sheet is driven therebetween, at which time the driving force imparted to the resilient member by the driving means aids in accelerating the resilient member in the direction of sheet transport, thus assisting the sheet in overcoming the inertial resistance imposed by the resilient member. During the transport of the sheet between the sheet-bearing surface and the operative position of the processing element, the bearing surface continuously urges the sheet against the operative position.

BRIEF DESCRIPTION OF THE DRAWING

In order to facilitate a more complete understanding of the present invention, a description of a preferred embodiment thereof is hereinafter presented with reference to the drawing figures in which.

DESCRIPTION OF A PREFERRED EMBODIMENT

Figures 1, 2, 3:
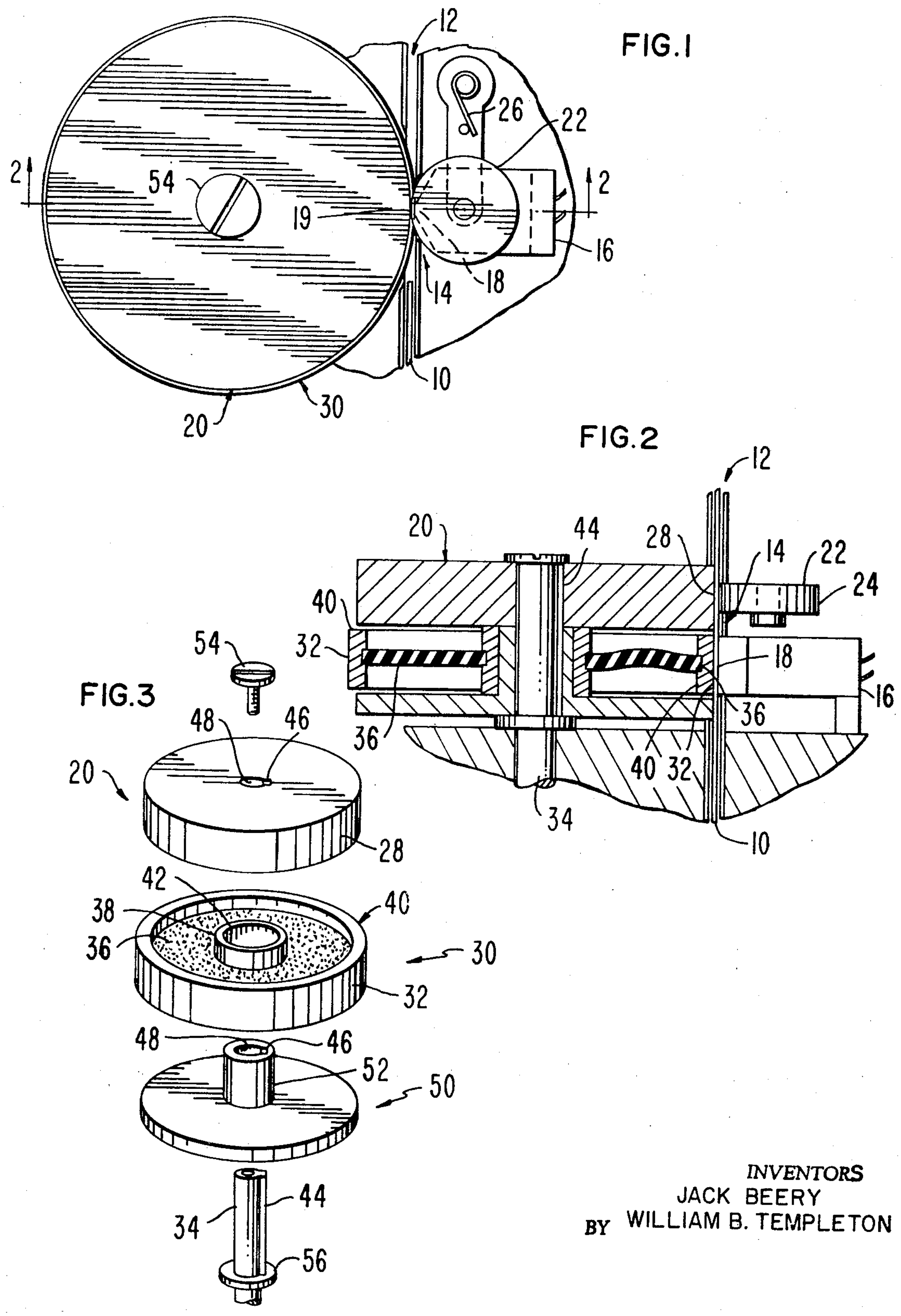
FIG. 1 is a top plan view of a portion of a sheet transporting apparatus incorporating the invention.
FIG. 2 is a section view taken along lines 2—2 of FIG. 1 showing a sheet being transported through the operating station.
FIG. 3 is an exploded perspective view of an assembly in which the preferred form of the invention is contained.

Referring now to the drawings wherein like reference characters designate identical elements in each of the Figures, and particularly to FIG. 1, there is shown a paper sheet or document 10 being transported through a guideway 12 toward an operating station generally designated at 14. In the exemplary illustration the operating station is formed by a processing element or MICR read head 16 disposed adjacent to the path of travel of the document 10. A linear operative position 18 of the read head 16 extends toward and parallel to the path of travel of the document 10 and forms the read head's closest point of approach to the transported document. The linear operative position 18, in the case of an MICR read head 16, corresponds with the aligned gaps of the various magnetic elements of a typical read head. A bight 19 formed by a drive roller 20 and an idler roller 22 is vertically aligned with the operating station 14. A document 10 driven by transport means (not shown) into the bight 19 of the two rollers 20 and 22 is driven through the operating position 14 by the bight 19. The periphery 24 of the idler roller 22 is resiliently biased by a coil spring 26 into engagement with the periphery 28 of the drive roller 20 to yieldably accommodate documents of varying thickness.

Using processing elements such as MICR or OCR read heads 16, it is important that the document 10 transported past the operative position 18 is maintained either in contact with or at a uniform distance from the operative position 18. Deviations in this distance, or gap, result in fluctuations of output intensity from the head 16, which is likely to cause a misread of the information on the document 10. Positioning of the bight 19 of the drive and idler rollers 20 and 22 in close proximity to the operating station 14 aids in maintaining a transported document 10 in contact with the operative position 18 of the processing element 16. It has been found that this provision does not completely solve the problem. Pursuant to the present invention resolution of this difficulty has been achieved by providing a resilient member, generally designated at 30, having a sheet-bearing surface 32 that continually urges a document 10 against the operative position 18 of the processing element 16. As illustrated in FIGS. 2 and 3 the resilient member 30 is annularly formed about a driven shaft 34. A resilient body portion 36 of uniform radial thickness forms a web-like structure between an inner sleeve 38 and an outer ring 40. The sleeve 38 has a dimensionally stable inner surface 42 for frictionally bearing upon an annular post 52. The diametric dimension across the inner surface 42 of the sleeve 38 is slightly greater than the diameter of the annular post 52 so that the sleeve may be axially rotated thereabout. Sufficient contact between the inner surface 42 of the sleeve 38 and the annular post 52 is maintained when the bearing surface 32 is not frictionally restrained, so that axial rotation of the driven shaft 34 and the post 52 imparts a rotational force to the sleeve. The utility of this force will be later described.

Being coaxially mounted about the sleeve 38 and joined thereto by the resilient body portion 36, the ring 40 and the sheet-bearing surface 32 thereof serves to contact a transported sheet or document 10 and to urge it into contact with the operative position 18 of the read head 16. The outer or sheet-bearing surface 32 of the ring 40 forms a circular cylinder coaxially positioned relative to the driven shaft 34 and the sleeve 38. The axial dimension of the sheet-bearing surface 32 is substantially the same as the length of the linear operative position 18 of the processing element 16, so that the document 10 is uniformly urged into contact with the operative position at all points along its length. The sheet-bearing surface 32 is composed of a material having a low coefficient of friction with the material of the sheet or document 10, such that a document will easily slide over the surface. In the preferred instance the sheet-bearing surface 32 is positioned in abutment with the operative position 18 of the read head 16. The frictional force between the operative position 18 and the sheet-bearing surface 32 is of a sufficient magnitude to hold the resilient member 30 rotationally motionless while the drive roller 20 is being rotated. This feature prevents the wearing of the read head 16 which would result from a continuous rubbing of the sheet-bearing surface 32 thereupon. In this configuration, until a document 10 is transported between the sheet-bearing surface 32 and the read head 16 the resilient member 30 is maintained rotationally motionless.

When a document 10 is driven into the operating station 14 it initially slides upon the sheet-bearing surface 32 and forces such surface away from the read head 16 to open a gap through which it may traverse. This shock is absorbed by the resilient body portion 36, which quickly dampens any oscillation that might result from the shock. Freed from the frictional restraint of the stationary processing element 16, the sheet-bearing surface 32 accelerates in the direction of sheet transport under the driving influence of the transported document 10 and the frictional force between the sleeve 38 and the driven annular post 52. As the sheet or document 10 is being transported through the operating station 14, the resilient member 30 accommodates any deviations in document thickness, such as caused by a staple carried by the transported document. Since the sheet-bearing surface 32 is moving in the direction of document transport, the surface effectively rolls over thickness deviations in the document, thus reducing the shock of such deviations upon the bearing surface.

The manner in which the resilient member 30 is structurally associated with the drive roller 20 may best be described in connection with FIG. 3. There is shown a driven shaft 34 having a key 44 for mating with keyways 46 in center apertures 48 of the drive roller 20 and a bearing collar 50 respectively. So assembled the drive roller 20 and bearing collar 50 are rotatably joined to the drive shaft 34. The sleeve 38 of the resilient member 30 is mounted on the annular post 52 of the bearing collar 50. Since the bearing collar 50 is rotationally joined with the driven shaft 34, the annular post may be conceived as merely an enlargement of the driven shaft for purposes of its operative relationship to the resilient member 30. Sandwiched between the drive roller 20 and the bearing collar 50, the sheet-bearing surface 32 of the resilient member 30 is maintained in exacting alignment with the operative position 18 of the read head 16. A fastener such as a screw 54 on the bearing collar side maintains the assembly in an axially fixed position on the driven shaft 34.

While the invention has been described in terms of a preferred embodiment there are other alternatives and modifications that may be apparent to one skilled in the art in light of the foregoing description. It is intended, therefore, to include within the appended claims all such alternatives and modifications that do not truly depart from the inventive concept disclosed herein.

What is claimed is:

1. In apparatus for serially transporting paper sheets or the like past a processing element, a device for maintaining the transported sheets in contact with an operative position of the processing element comprising:
- a resilient member having a sheet-bearing surface extending through an operating station and therein contacting the operative position of the processing element, said sheet-bearing surface being resiliently yieldable at the point of contact with the processing element to accept a sheet transported therebetween and movable past the processing element in the direction of sheet transport;
- driving means for imparting a driving force to said resilient member and for urging the sheet-bearing surface through the operating station in the direction of sheet transport; and
- means providing a predetermined frictional coupling between said resilient member and said driving means, whereby the displacement of the sheet-bearing surface is normally restrained by the processing element and the driving force imparted to said resilient member by said driving means aids in accelerating the resilient member in the direction of sheet transport upon the displacement of a sheet through the operating station.

2. A device as defined by claim 1 wherein the sheet-bearing surface of said resilient member is composed of a material having a relatively low coefficient of friction with the sheets so that a sheet rapidly transported into the operating station may initially slide upon the sheet-bearing surface.

3. A device as defined by claim 1 wherein the shape of the sheet-bearing surface of said resilient member is characterized by a right circular cylinder.

4. A device as defined by claim 3 wherein said resilient member has a center aperture and a resilient body portion surrounding the center aperture in a substantially circular configuration, said center aperture having an inner surface cooperating with said frictional coupling means to thereby provide frictional engagement with said driving means.

5. A device as defined by claim 4 wherein the resilient body portion has a uniform radial thickness, the radial termination of the body portion being connected to and providing support for the sheet-bearing surface.

6. A device as defined by claim 5 wherein said driving means is an axially driven shaft and wherein said frictional coupling means comprises a key fixed to said shaft, a bearing collar having a keyway cooperable with said key and an annular post frictionally cooperating with said inner surface of said center aperture of said resilient member such that the sheet-bearing surface of said resilient member is urged through the operating station in the direction of sheet transport.

7. In apparatus for serially transporting paper sheets or the like past a linear operative position of a processing element including a drive roller for driving sheets over the linear operative position, the drive roller having a rotational axis disposed substantially parallel with and outwardly from the linear operative position, and a driven shaft coaxially coupled with the drive roller for imparting an axial rotation thereto, a device for maintaining transported sheets in contact with the linear operative position of the processing element comprising:
- a resilient member having a center aperture and a resilient body portion surrounding the center aperture in a substantially circular configuration, the radial termination of the body portion being connected to and supporting a sheet-bearing surface normally disposed in abutment with the operative position of the processing element; and
- means providing a predetermined frictional coupling between said center aperture of said resilient member and said driven shaft such that said abutment of said sheet-bearing surface with said processing element is normally effective to inhibit rotational motion thereof, whereby the driving force imparted to said resilient member by said driven shaft and said frictional coupling means aids in accelerating the resilient member upon the transport of a sheet between the processing element and the sheet-bearing surface of said resilient member.

8. A device as defined by claim 7 wherein said resilient member has a resilient body portion of uniform radial thickness surrounding the center aperture thereof.

9. A device as defined by claim 8 wherein the inner surface of the center aperture of said resilient member is formed by a sleeve composed of a relatively hard material for frictionally cooperating with an annular post of said frictional coupling means.

10. A device as defined by claim 9 wherein the body portion of said resilient member is characterized by a thin web of resilient material with a relatively non-resilient ring of greater thickness than the web being circularly formed thereabout, the ring having an outer surface forming the sheet-bearing surface of said resilient member.

11. A device for serially transporting paper sheets or the like past a processing element comprising:
- a drive roller disposed in axially transverse relationship with the direction of sheet transport, a periphery of said drive roller being transversely offset from an operative position of the processing element with respect to the direction of sheet transport for drivably engaging a sheet;
- a driven shaft disposed in coaxial relationship with said drive roller and rigidly coupled thereto, for imparting axial rotation to said drive roller;
- a resilient member having a center aperture and a sheet-bearing surface juxtaposed to the operative position of said processing element; and
- means providing a predetermined frictional coupling between said center aperture of said resilient member and said driven shaft such that a predetermined axial torque is applied to said resilient member to thereby urge a transported sheet toward said processing element.

12. A device as defined by claim 11 wherein the sheet-bearing surface of said resilient member is biased in contact with the operative position of said processing element, the frictional resistance of the processing element being normally effective to maintain the sheet-bearing surface motionless in opposition to the torque applied by said driven shaft and said frictional coupling means, whereby said torque is effective to assist in angularly accelerating said resilient member when a sheet is driven by said drive roller past the processing element.

* * * * *